United States Patent [19]

Young

[11] Patent Number: 4,673,522

[45] Date of Patent: Jun. 16, 1987

[54] METHODS FOR REMOVING OBSTRUCTIONS FROM CONDUITS WITH UREA-SULFURIC ACID COMPOSITIONS

[75] Inventor: Donald C. Young, Fullerton, Calif.

[73] Assignee: Union Oil Company of California, Los Angeles, Calif.

[21] Appl. No.: 675,774

[22] Filed: Nov. 28, 1984

Related U.S. Application Data

[63] Continuation-in-part of Ser. No. 453,496, Dec. 27, 1982, which is a continuation-in-part of Ser. No. 318,629, Nov. 5, 1981, Pat. No. 4,445,925.

[51] Int. Cl.$^4$ .................. B08B 3/08; C11D 7/08; C11D 7/32; C23G 3/04
[52] U.S. Cl. .................. 252/87; 134/3; 134/19; 134/22.11; 134/22.14; 252/142; 252/148
[58] Field of Search .............. 134/3, 22.11, 19, 22.14; 252/87, 142, 148

[56] References Cited

U.S. PATENT DOCUMENTS

| | | | |
|---|---|---|---|
| 3,037,887 | 6/1962 | Brenner | 134/22 |
| 3,463,733 | 8/1969 | Achenbach | 252/79.4 |
| 3,523,825 | 8/1970 | Callahan | 134/2 |
| 3,538,008 | 11/1970 | Ancel | 252/146 |
| 3,936,316 | 2/1976 | Gulla | 134/3 |
| 4,096,871 | 6/1978 | Vlahakis | 134/40 |
| 4,116,664 | 9/1978 | Jones | 71/549 |
| 4,214,888 | 7/1980 | Young | 71/28 |
| 4,315,763 | 2/1982 | Stoller et al. | 71/29 |
| 4,397,675 | 8/1983 | Young | 71/28 |
| 4,402,852 | 9/1983 | Young | 252/182 |
| 4,404,116 | 9/1983 | Young | 252/182 |
| 4,445,925 | 5/1984 | Young | 71/28 |
| 4,447,253 | 5/1984 | Young | 71/28 |
| 4,512,813 | 4/1985 | Young | 134/27 |

OTHER PUBLICATIONS

Donald C. Young, U.S. patent application Ser. No. 673,358, filed 11-20-84, for Methods for Hydrolyzing Polysaccharides and Compositions Useful Therein.
Donald C. Young, U.S. patent application Ser. No. 673,359, filed 11-20-84 for Methods for Chemically Reducing Nitrogen Oxide Emissions.
Donald C. Young, U.S. patent application Ser. No. 673,508, filed 11-20-84 for Thermally Stable Urea-Sulfuric Acid Compositions and Methods of Manufacture.
Donald C. Young, U.S. patent application Ser. No. 679,235, filed 12-7-84 for Methods for Cleaning Materials.
Donald C. Young, U.S. patent application Ser. No. 688,689, filed 1-3-85 for Pesticidal Compositions and Methods for Controlling Pests.
Donald C. Young, U.S. patent application Ser. No. 442,296, filed 11-17-82 for Systemic Herbicidal Compositions and Methods of Use.
Donald C. Young, U.S. patent application Ser. No. 444,667, filed Nov. 26, 1982 for Methods for Controlling Vegetation.
Donald C. Young, U.S. patent application Ser. No. 453,282, filed 12-27-82 for Methods for Selectively Controlling Plant Suckers.
Donald C. Young, U.S. patent application Ser. No. 453,496, filed 12-27-82 for Acid-Catalyzed Reactions and Compositions for Use Therein.
Donald C. Young, U.S. patent application Ser. No. 455,268, filed 1-3-83 for Cellulosic Compositions and Methods for Treating Cellulosic Materials.
Donald C. Young, U.S. patent application Ser. No. 455,317, filed 1-3-83 for Plant Seed Compositions and Methods for Treating Plant Seeds.
The Condensed Chemical Dictionary, Seventh Edition, Van Nostrand Reinhold Company, New York, 1969, p. 908.
D. F. du Toit, Verslag Akad.Wetenschappen, 22, 573–4 (Abstracted in Chemical Abstracts, 8, 2346, (1914)).
L. H. Dalman, "Ternary Systems of Urea and Acids, I. Urea, Nitric Acid and Water, II. Urea Sulfuric Acid and Water, III. Urea, Oxalic Acid and Water", JACS, 56, 549–53, (1934).
Sulfur Institute Bulletin No. 10, (1964), "Adding Plant Nutrient Sulfur to Fertilizer".

*Primary Examiner*—Dennis L. Albrecht
*Attorney, Agent, or Firm*—Michael H. Laird; Greg Wirzbicki; Dean Sandford

[57] ABSTRACT

Acid-soluble and/or hydrolyzable obstructions are removed from conduits by contacting such obstructions with a composition containing urea and sulfuric acid in which the urea/sulfuric acid molar ratio is less than 2. The urea/sulfuric acid compositions may optionally contain other components such as surfactants and/or non-aqueous polar solvents which accentuate the activity of the compositions toward hydrophobic materials. Urea-sulfuric acid compositions which contain water and which have $H_2O/(urea+H_2SO_4)$ molar ratios below about 2.5 are particularly useful for removing obstructions by partial or complete hydrolysis.

31 Claims, No Drawings

METHODS FOR REMOVING OBSTRUCTIONS FROM CONDUITS WITH UREA-SULFURIC ACID COMPOSITIONS

RELATED APPLICATIONS

This application is a continuation-in-part of my copending application Ser. No. 453,496, Acid-Catalyzed Reactions and Compositions for Use Therein, filed Dec. 27, 1982, which was a continuation-in-part of then copending application Ser. No. 318,629, Methods of Producing Concentrated Urea-Sulfuric Acid Reaction Products, filed Nov. 5, 1981, now U.S. Pat. No. 4,445,925.

BACKGROUND

1. Field of the Invention

This invention relates to the field of conduit obstruction removal, and in particular it relates to methods for removing obstructions from the interior of conduits.

2. Description of the Art

Fluid-handling conduits, including industrial, municipal, household, and agricultural process and water inlet and drain lines, as well as inline equipment such as orifices, nozzles, valves, screens, filters, metering devices, heat exchangers, etc., often become fouled or completely plugged with organic or inorganic debris, impurities, corrosion, and/or components of the fluid customarily passed through the conduit. A variety of physical and chemical procedures and compositions have been devised to dissolve or physically dislodge most if not all types of such organic and inorganic obstructions. For instance, it is known that acids, such as sulfuric acid, will dissolve a variety of inorganic obstructions such as metal salts, carbonates, and other materials and that they will chemically attack and weaken a variety of organic obstructions thereby facilitating the removal of such organic obstructions.

Sulfuric acid is one the strongest, readily available acids and, but for a number of significant disadvantages associated with use of sulfuric acid, it is an ideal candidate for the removal of obstructions from conduits. However, sulfuric acid is highly corrosive and therefore difficult to handle, and it can cause severe corrosive damage to conduits and in-line equipment. It promotes a variety of side reactions with many materials including dehydration, sulfonation, and oxidation, in which it is consumed, thereby eliminating its activity as an active chemical agent. Its heat of dilution in many solvents, particularly in water, is very high, and therefore the addition of sulfuric acid to water and other solvents must be handled with great care. In fact, these disadvantages are so severe that they eliminate sulfuric acid as a viable obstruction-removing agent in many circumstances.

Jones, in U.S. Pat. No. 4,116,664, disclosed that the addition of urea to sulfuric acid to form certain combinations of urea and sulfuric acid resulted in a product which was non-toxic, non-caustic, and non-corrosive to black iron and that, therefore, it could be safely transported, handled, stored, and applied, as a fertilizer, with ordinary equipment. Both Jones, supra, and Verdegaal et al. (U.S. Pat. No. 4,310,343) disclose methods for producing certain combinations of urea and sulfuric acid. Verdegaal et al. disclosed methods of manufacturing urea-sulfuric acid compositions which contain at least 50 weight percent urea.

Other authors have also discussed the nature and manufacture of combinations of urea and sulfuric acid. For instance, D. F. du Toit, Verslag Akad. Wetenschappen, 22, 573–4 (abstracted in chemical abstracts, 8, 2346, 1914) and L. H. Dalman, "Ternary Systems of Urea and Acid" JACS, 56, 549–53 (1934), disclosed that urea forms mono- and diurea adducts with sulfuric acid. Dalman defined the phase relationships between the solid phase and saturated solutions containing urea and sulfuric acid at certain temperatures. While these authors described several characteristics of and methods for manufacturing combinations of urea and sulfuric acid, they did not observe that certain urea-sulfuric acid compositions are particularly active protenating and hydrolyzing agents in which the disadvantages customarily associated with sulfuric acid, such as its dehydrating, sulfonating, and oxidizing activity, are markedly reduced.

SUMMARY OF THE INVENTION

I have now found that urea-sulfuric acid compositions in which the urea/sulfuric acid molar ratio is less than 2, and particularly such compositions in which a substantial proportion of the sulfuric acid is present as the monourea adduct of sulfuric acid, retain a substantial proportion, or essentially all, of the protenating and hydrolyzing activity of sulfuric acid, and that, accordingly, such compositions can be employed to remove obstructions from conduits. I have also found that such compositions which also contain water efficiently hydrolyze acid-hydrolyzable matter and thereby facilitate the removal of obstructions which contain such matter. Urea-sulfuric acid compositions in which the $H_2O/(urea+H_2SO_4)$ molar ratio is less than about 2.5 even more actively and efficiently remove obstructions from conduits, and they are less corrosive and more stable than compositions in which the $H_2O/(urea+H_2SO_4)$ molar ratio is significantly above 2.5. The useful urea-sulfuric acid compositions can contain optional non-aqueous polar solvents and/or surfactants which act as carriers and diluents for the active urea-sulfuric acid component and which facilitate the activity of such components for the removal of obstructions which contain hydrophobic substances.

The urea-sulfuric acid components useful in the methods of this invention have less dehydrating, oxidizing, and sulfonating activity than does sulfuric acid which is not combined with urea, and their addition to water and other solvents is much less exothermic than is the admixture of sulfuric acid with such materials. Accordingly, the useful urea-sulfuric acid components are easier to handle than is sulfuric acid. They are less corrosive to conduit materials and are therefore less damaging. And they are more efficient than is sulfuric acid since sulfuric acid which is combined with urea is not consumed by sulfonation, oxidation, and/or dehydration reactions. Thus, the useful components are more stable and efficient since less material is required to accomplished the same purpose. Urea-sulfuric acid components which have urea/sulfuric acid molar ratios below 2 are more active and efficient protenating and hydrolyzing agents for both organic and inorganic materials than are compositions which have molar ratios of 2 or higher. Compositions in which the $H_2O/(urea+H_2SO_4)$ molar ratio is below about 2.5 are even less corrosive and more stable than are compositions in which that molar ratio is substantially above 2.5. Accordingly, such compositions are even more active hydrolyzing and protenating agents for both organic and inorganic components of conduit obstructions, and they are even easier to handle and produce less damage to conduit materials.

DETAILED DESCRIPTION OF THE INVENTION

In accordance with the novel methods of this invention, organic and/or inorganic obstructions in the interior of conduits are removed by contacting such obstructions with a urea-sulfuric acid component in which the urea/$H_2SO_4$ molar ratio is less than 2 under conditions of contact time, temperature, and concentration of the urea-sulfuric acid component which sufficiently weaken or dissolve the obstruction and thereby facilitate or effect its removal from the conduit. Urea-sulfuric acid components which contain water and in which the $H_2O/(urea+H_2SO_4)$ molar ratio is below 2.5 are even more chemically stable and efficient protenating and hydrolyzing agents than are compositions in which that ratio is significantly above 2.5, and they remove obstructions from conduits more rapidly and efficiently than do compositions which have higher relative water concentrations. The useful urea-sulfuric acid components also can contain surfactants and/or non-aqueous polar solvents which accentuate the activity of the urea-sulfuric acid component toward hydrophobic obstruction components. Such non-aqueous polar solvents also can serve as solvent-dispersents for the urea-sulfuric acid component.

The novel methods of this invention can be employed to remove a wide variety of organic and inorganic obstructions from conduits including all materials which are subject to hydrolytic acid attack and/or which are otherwise reactive with sulfuric acid. Both natural and synthetic acid-reactive organic materials can be removed by the methods of this invention including protenaceous and cellulosic matter and natural and synthetic resins, varnishes, adhesives, algae, mold, shellac, etc. Typical protenaceous obstructions and obstruction components include plant and animal matter such as process wastes, protenaceous products, gelatins, hair, animal hide, algae, mold, and others. Typical cellulosic materials include plant matter such as cotton, paper products, wood processing wastes, and plant matter such as grass, plant stubble, starches, and the like. Illustrative of typical inorganic obstructions and obstruction components are metal oxides, hydroxides, carbonates, thiocarbonates, sulfides, oxysulfides, and simple and complex organic and inorganic salts such as halides, sulfates, sulfites, bisulfites, phosphates, vanadates, molybdates, formates, oxylates, hypochlorites, oxyhalides such as iodates and perchlorates, silicates, metallo- silicates such as calcium-magnesium silicate, metallo- carbonates such as calcium-magnesium carbonate, nitrates, nitrides, nitrites, permanganates, phosphides, plumbates such as calcium plumbate, plumbites such as calcium plumbite, tungstates such as magnesium tungstate, aluminates, e.g., $NaAlO_2$, antimonates and thioantimonates, e.g., $NaSbO_3$, bismuthates, e.g., $NaBiO_3$, borates, chromates, haloborates, perhenates, e.g., $NaReO_4$, perruthenates e.g.,$KRuO_4$, uranates, e.g., $Na_2UO_4$, perurantes, e.g., $Na_2UO_5$, stannates, e.g., $Na_2SnO_3$, platinates and thioplatinates, metallo-sulfates, e.g., $CaK_2(SO_4)_2$, selenates, e.g., $CaSeO_4$, silicides such as calcium silicide, silicohalides such as calcium silicon floride, arsenates, e.g., $Cu_3(AsO_4)_2$, bromates such as copper bromate, cyanides, metallo-cyanides such as ferricyanides, metallo-halides, e.g., $CuCl_2.2KCl$, and the like. Probably the most common inorganic obstruction components outside of the chemical processing, mining, and petroleum industries, are corrosion and hard water deposits.

The methods of this invention can be used to remove obstructions from conduits constructed of a wide variety of materials including ferrous and nonferrous metals, plastics, elastomers, ceramics, wood, and glass, and structural materials that are lined with such substances. Typical ferrous metals include carbon steels, black iron, cast iron, stainless steels including both high and low alloy stainless steels containing chromium, molybdenum, nickel, vanadium, rare earth metals, and/or other components. Illustrative non-ferrous metals include aluminum, titanium, magnesium, zinc, tin, chromium, and materials which are plated with and/or alloyed with such metals.

Essentially, all plastic and elastomeric conduit materials can be treated by the methods of this invention with several exceptions. The useful urea-sulfuric acid components hydrolyze nylons, rayons, cellulosics such as cotton, and protenaceous materials such as leathers and should not be employed to treat conduits constructed of or containing functioning components constructed of such materials. Typical plastic and elastomeric conduit structural materials include polyvinylchlorides, polyolefins such as polyethylene and polypropyllene, polyacrylates, polystyrene, phenol-formaldehyde resins, styrene-butadiene elastomers, and other synthetic materials.

Illustrative of other suitable conduit structural materials are ceramics such as ceramic tiles, cement, and the like, and essentially all forms of wood and glass. It should be observed, however, that the useful urea-sulfuric acid components gradually hydrolyze wood; therefore, conduits containing essential components containing wood should be treated only under moderate conditions of time, temperature, and concentration of the urea-sulfuric acid component.

The methods of this invention can be employed to remove obstructions from all types of industrial, agricultural, municipal, and household fluid-handling equipment, including equipment designed to handle liquids and/or vapors. Such equipment includes conduits of all types and in-line equipment such as orifices, nozzles, valves, screens, filters, metering devices, heat exchange equipment, radiators, boiler and furnace tubes, and wells including water, geothermal, oil, and water injection wells such as those employed in the Frasch sulfur process. Thus, the methods of this invention can be employed to remove obstructions from essentially all varieties of industrial process, water, and steam handling conduits and in-line equipment, municipal, household, and office water supply and drain systems, steam operated electrical generating systems, agricultural water supplies, e.g., irrigation systems, and the like.

The useful urea-sulfuric acid components are combinations of urea, sulfuric acid, and water (in the presence or absence of other components) in which the urea/sulfuric acid molar ratio is less than 2. Within this range of molar ratios, at least a portion of the sulfuric acid is present as the monourea adduct of sulfuric acid. I have found that the monourea adduct of sulfuric acid efficiently and rapidly weakens and/or removes obstructions in the interior of fluid conduits in the presence of water. In contrast, the diurea adduct of sulfuric acid, the only form which exists in mixtures that have urea/sulfuric acid molar ratios above 2, has much less ability to hydroliticly attack acid-sensitive components, particularly the hydrolyzable materials such as protenaceous and cellulosic deposits referred to above. Accordingly, the useful urea-sulfuric acid components will usually have urea/sulfuric acid molar ratios of at least about ¼ and less than 2, generally about ¼ to about 7/4. The more preferred compositions, which contain less uncomplexed sulfuric acid, have urea/sulfuric acid molar ratios of at least about ½, generally about ½ to about 3/2. The most preferred urea-sulfuric acid components have urea/sulfuric acid molar ratios of at least about 1/1 such that all of the sulfuric acid is complexed with urea as either the mono- or diurea adduct. It is also preferable to assure that a substantial portion of the sulfuric acid is present as the mono- rather the diurea adduct; thus, the most preferred compositions are those which have urea/sulfuric acid molar ratios within the range of about 1/1 to about 3/2.

The useful urea-sulfuric acid components should contain sufficient urea and sulfuric acid to weaken or remove the treated obstruction within a reasonable period of time. I have found that catalytic amounts of urea and sulfuric acid, i.e., about 1 weight percent in aqueous or non-aqueous solutions, are sufficient for this purpose in many instances. However, higher urea and sulfuric acid concentrations produce higher rates of hydrolysis and/or acid attack of conduit obstructions and are often preferred, particularly for the treatment of deposits which contain hydrolyzable components such as protenaceous and cellulosic matter. Accordingly, the urea and sulfuric acid, in combination, will usually constitute at least about 1, generally at least about 5, and preferably about 5 to 100 weight percent of the combination of urea, sulfuric acid, and water (in the presence or absence of other solvents, diluents, adjuvants, or other components). More concentrated compositions are preferred for the treatment of more refractory obstructions and hydrolyzable components of conduit obstructions, and, in such compositions, the urea and sulfuric acid, in combination, will often constitute at least about 30, preferably at least about 60, and even 80 percent or more of the urea-sulfuric acid component.

Water is a preferred component of urea-sulfuric acid components which are employed to remove hydrolyzable materials, and it can be present in very minor amounts of at least about 0.2 weight percent. The useful urea-sulfuric acid components can also be very dilute, i.e., they can contain up to 99 weight percent water or more. Accordingly, water concentration can range from about 0.2 to about 99 weight percent but will generally be within the range of about 0.2 to about 90 weight percent, preferably about 0.5 to about 70 weight percent, based on the combined weight of urea, sulfuric acid, and water. Of course, the more concentrated urea-sulfuric acid components referred to above which are preferred for treating more refractory obstructions will have correspondingly lower water concentrations. Urea-sulfuric acid components which are particularly preferred for the treatment of more refractory and/or hydrolyzable obstructions have $H_2O/(urea+H_2SO_4)$ molar ratios below 2.5 since such compositions are substantially more effective for the removal of such obstructions. The urea and sulfuric acid, in combination, constitute at least about 60 weight percent of these preferred components based on the combined weight of urea, sulfuric acid, and water. Without being constrained to any particular theory explaining this effect, and without limiting the scope of this invention thereby, it appears that the presence of sufficient water to provide 3 or more moles of water per mole of urea and 2 or more moles of water per mole of sulfuric acid (the amount of water required to hydrate those respective components) attenuates the activity of the urea-sulfuric acid component for the protonic-hydrolytic attack of refractory and/or hydrolyzable obstructions.

As discussed in my copending Ser. No. 673,508, Thermally Stable Urea-Sulfuric Acid Compositions and Methods of Manufacture, filed Nov. 20, 1984, which is incorporated herein by reference in its entirety, urea-sulfuric acid compositions which contain less than about 1 weight percent water (based on water, urea and sulfuric acid) are much more thermally stable than are compositions which have substantially higher water concentrations. For instance, urea-sulfuric acid compositions which have urea/sulfuric acid molar ratios of about 1 and which contain about 10 weight percent water have incipient decomposition temperatures of about 176° F. (80° C.) and decompose explosively at about 190° to 200° F. (about 90° C.). Incipient decomposition temperature is that temperature at which the urea-sulfuric acid component begins to decompose as indicated by effervescence ($CO_2$ evolution) and/or discoloration of the composition, as discussed in my above referenced application Ser. No. 318,629 which is incorporated herein by reference in its entirety. In contrast, otherwise identical urea-sulfuric acid compositions which contain about 1 weight percent water or less can be heated to temperatures above 80° C. and even above 90° or 100° C. without incipient decomposition. The advantages of employing such low water-content compositions are evident when it is desired to treat a conduit obstruction at temperatures of 80° C. or higher.

The useful urea-sulfuric acid components may optionally contain other components which do not negate the activity of the useful components for weakening or removing obstructions. In fact, the use of urea-sulfuric acid components which contain polar solvents (other than water) and/or surfactants is sometimes preferred, particularly for the treatment of deposits or obstructions which contain hydrophobic substances such as lignins, fatty materials, e.g., lipids, and the like. Illustrative solvents include organic and inorganic solvents in which both urea and sulfuric acid are soluble such as dimethylsulfoxide; alcohols, e.g., methanol, glycol, etc., acetone, methylethylketone, tetrahydrofuran; halogenated hydrocarbons such as trichloromethane and chloroform, and the like. One or more of such polar solvents can be present over a wide range of concentration and usually within the range of about 2 to about 95 weight percent based on the combined weight of solvents, urea, and sulfuric acid.

Suitable surfactants are discussed in my copending application Ser. No. 453,496, Acid Catalyzed Reactions and Compositions for Use Therein, filed Dec. 27, 1982, which is incorporated herein by reference in its entirety. Illustrative of useful surfactants are nonionics such as the alkylphenol polyethylene oxides, anionics such as the long-chain alkylsulfonates, and cationics such as 1-hydroxyethyl-2-heptadecenyl gloxalidin. Of these, the polyethylene oxide nonionic surfactants are particularly preferred. Illustrative of preferred specific surfactants is the nonionic surfactant marketed by Thompson-Hayward, Inc. under the trademark T-MULZ 891. Surfactants can be employed over a wide range of concentrations. Useful surfactant concentrations are usually at least about 0.1 and are typically about 0.1 to about 10 weight percent based on the combined weight of surfactant, urea, sulfuric acid, and solvent (if present).

The urea-sulfuric acid components useful in the methods of this invention can also contain corrosion inhibitors, and the presence of such inhibitors is particularly preferred when the composition of the treated conduit is subject to acid attack. Corrosion inhibitors which are particularly suitable for use with solutions which contain urea and sulfuric acid are discussed in my application Ser. Nos. 330,904 and 331,001, now U.S. Pat. Nos. 4,404,116 and 4,402,852, respectively, both of which were filed Dec. 15, 1981, and which are incorporated herein by reference in their entireties.

The urea-sulfuric acid components useful in the methods of this invention can be prepared by mixing urea and the selected solvent(s) (if any), and sulfuric acid under conditions sufficient to avoid excessive heating of the solution due to the heat of dilution and adduct formation. The heats of dilution of urea and sulfuric acid and of adduct formation are so great that the amount of heat released (particularly in the manufacture of solutions which have higher sulfuric acid concentrations) can cause the mixture to boil, explode, and/or exceed the thermal decomposition temperature of urea, acid, or the urea-acid adduct. Procedures suitable for manufacturing the more concentrated solutions of urea and sulfuric acid and for determining incipient decomposition temperature are discussed in my application Ser. Nos. 318,343 and 318,629, both of which were filed Nov. 5, 1981, now U.S. Pat. Nos. 4,397,675 and 4,445,925, respectively, which are incorporated herein by reference in their entireties. While those applications were specifically directed to the manufacture of concentrated aqueous urea-sulfuric acid solutions, the procedures described therein can also be employed to control the substantial exotherms involved in the production of urea-sulfuric acid components in other solvents.

The solvent in which the urea and sulfuric acid are dissolved (if any) should have a sufficient affinity for both the urea and acid to dissolve the desired proportions of each component and should not be reactive with the urea or sulfuric acid. Illustrative of suitable solvents are polar solvents such as water, dimethylsulfoxide (DMSO), methanol, glycol, methylethyl ketone (MEK), tetrahydrofuran, halogenated compounds, e.g., trichloromethane, and the like. Solutions of urea in excess sulfuric acid, with or without additional solvent, can also be employed. Water is usually the most preferred solvent due to its affinity and lack of reactivity with urea and sulfuric acid.

The obstruction to be removed should be contacted with a sufficient quantity of the useful urea-sulfuric acid component to completely treat all exposed portions of the obstruction with the useful component for a period of time and at a temperature sufficient to at least significantly weaken, if not remove, the obstruction. Such contacting can be efficiently achieved by either spraying the obstruction, i.e., the interior of the fouled conduit, or filling the affected portion of the conduit with the selected urea-sulfuric acid component. Contact times of as little as 1 minute are adequate to significantly weaken the more susceptible obstructions such as the inorganic materials referred to above, particularly when they are treated with the more concentrated urea-sulfuric acid components at higher temperatures. However, contact times of at least about 5 minutes are generally employed. Of course, longer contact times are required to remove larger obstructions and to remove more refractory materials such as protenaceous and cellulosic obstructions, particularly when such obstructions contain hydrophobic substances. Thus, contact times will usually range from about 1 minute to about 48 hours, typically about 5 minutes to about 24 hours, and preferably at least about 10 minutes to about 24 hours.

The useful urea-sulfuric acid components will chemically attack and weaken all of the types of obstructions referred to above at relatively low temperatures, e.g., 0° C. However, reaction rate increases as temperature is increased. Thus, contacting temperatures will usually range from about 0° C. to about 80° C. with urea-sulfuric acid components which contain substantially more than 1 weight percent water based on the combined weight of water, urea, and sulfuric acid. However, as mentioned above, thermally stable urea components can be employed which contain about 1 weight percent water or less. Such thermally stable components can be contacted with deposits at temperatures in excess of 80° C. or, if desired, in excess of 90° C. or even 100° C. or higher.

The invention is further described by the following examples which are illustrative of specific modes of practicing the invention and are not intended as limiting the scope of the invention as defined by the appended claims.

EXAMPLE 1

A one-inch U-trap sink drain plugged with hair and hard water soap residue can be unplugged by pouring into the drain 400 grams of a solution of urea and sulfuric acid in water having a urea/sulfuric acid molar ratio of 1 and a $H_2O/(urea+H_2SO_4)$ molar ratio of 2 containing 5 weight percent T-MULZ 891 for 30 minutes at 25° C.

EXAMPLE 2

Hard water deposits obstructing the interior of ½ inch I.D. No. 310 stainless steel heat exchanger tubes can be removed by filling the tubes with a urea-sulfuric acid component having a urea/$H_2SO_4$ molar ratio of 1.4 containing 20 weight percent water and 80 weight percent of the combination of urea and sulfuric acid for 1 hour at 70° C.

While particular embodiments of the invention have been described, it will be understood, of course, that the invention is not limited thereto since many obvious modifications can be made, and it is intended to include within this invention any such modifications as will fall within the scope of appended claims. For instance, deposits which do not significantly obstruct fluid flow but which impair the function of the conduit in some other respect (such as deposits in heat exchanger and boiler tubes which reduce heat transfer rate) can be removed by the methods of this invention.

Having described my invention, I claim:

1. A method for clearing an obstruction from the interior of a conduit, which method comprises the step of contacting said obstruction with a composition comprising urea, sulfuric acid, and water, in which the urea/sulfuric acid molar ratio is within the range of about ¼ to less than 2, and wherein said obstruction comprises matter selected from the group consisting of protein, cellulose, and combinations thereof.

2. The method defined in claim 1 wherein said obstruction further comprises matter selected from the group consisting of metal oxides, hydroxides, carbonates, thiocarbonates, and simple and complex metal salts, and combinations thereof.

3. The method defined in claim 1 wherein said obstruction comprises hydrophobic matter, and said composition comprises a member selected from the group consisting of surfactants, solvents, and combinations thereof.

4. The method defined in claim 1 wherein said composition comprises a member selected from the group consisting of surfactants, solvents, and combination thereof.

5. The method defined in claim 1 wherein said urea/sulfuric acid molar ratio is within the range of about ¼ to about 7/4, said urea and sulfuric acid, in combination, constitute at least about 30 weight percent of said composition, and said composition is contacted with said obstruction for a period of at least about 5 minutes.

6. The method defined in claim 1 wherein said urea/sulfuric acid molar ratio is within the range of about ½ to about 3/2, said urea and sulfuric acid, in combination, constitute at least about 60 weight percent of said composition, and said composition is contacted with said obstruction for a period of at least about 5 minutes.

7. The method defined in claim 1 wherein said conduit is selected from industrial, domestic, municipal, and agriculture water conduits, said urea/sulfuric acid molar ratio is within the range of about ¼ to about 7/4, and said composition is contacted with said obstruction for a period of at least 5 minutes.

8. The method defined in claim 7 wherein the $H_2O/(urea+H_2SO_4)$ molar ratio in said composition is less than 2.5, and said urea/sulfuric acid molar ratio is within the range of about ½ to about 3/2.

9. The method defined in claim 7 wherein said urea and sulfuric acid, in combination, constitute about 5 to 99.8 percent of said composition.

10. The method defined in claim 9 wherein said urea/sulfuric acid molar ratio is within a range of about 1/1 to about 3/2, and said obstruction comprises matter selected from the group consisting of metal oxides, hydroxides, carbonates, thiocarbonates, and simple and complex metal salts, and combinations, thereof.

11. The method defined claim 1 wherein said water constitutes about 1 weight percent or less of said composition based on the combined weight of said urea and said sulfuric acid.

12. The method defined in claim 11 wherein said composition is contacted with said obstruction at a temperature above 80° C.

13. The method defined in claim 11 wherein said composition is contacted with said obstruction at a temperature above about 90° C.

14. The method defined in claim 1 wherein said obstruction comprises acid-hydrolyzable matter other then protein and cellulose, and said urea/sulfuric acid molar ratio is at least about ½.

15. The method defined in claim 14 wherein the $H_2O/(urea+H_2SO_4)$ molar ratio in said composition is less than about 2.5.

16. The method defined in claim 14 wherein said composition further comprises a surfactant.

17. The method defined in claim 1 wherein said composition further comprises a non-aqueous polar solvent.

18. The method defined in claim 17 wherein the $H_2O/(urea+H_2SO_4)$ molar ratio in said composition is less than about 2.5.

19. The method defined in claim 1 wherein said urea and said sulfuric acid, in combination, constitute at least about 60 weight percent of said composition, and said obstruction further comprises matter selected from the group consisting of metal oxides, hydroxides, carbonates, thiocarbonates, and simple and complex metal salts, and combinations thereof.

20. The method defined in claim 19 wherein said urea and said sulfuric acid, in combination, constitute at least about 80 weight percent of said composition.

21. A method for removing an obstruction from the interior of a conduit which method comprises the step of contacting said obstruction with a composition comprising urea, sulfuric acid, and water in which the urea/sulfuric acid molar ratio is within the range of about ½ to about 3/2, and said obstruction comprises matter selected from the group consisting of protein, cellulose and combinations thereof.

22. The method defined in claim 21 wherein said composition comprises a member selected from the group consisting of surfactants, non-aqueous polar solvents, and combinations thereof.

23. The method defined in claim 21 wherein the $H_2O/(urea+H_2SO_4)$ molar ratio in said composition is less than about 2.5.

24. A method for removing an obstruction from the interior of a conduit which method comprises the step of contacting said obstruction with a composition comprising urea, sulfuric acid, and water, in which composition the urea/$H_2SO_4$ molar ratio is within the range of about ½ to about 3/2, said urea and said sulfuric acid, in combination, constitute at least about 5 weight percent of said composition, and said obstruction comprises matter selected from the group consisting of protein, cellulose, and combinations thereof.

25. The method defined in claim 24 wherein said urea/$H_2SO_4$ molar ratio is at least about 1/1, and said urea and said sulfuric acid, in combination, constitute at least about 30 weight percent of said composition.

26. A method for removing an obstruction from the interior of a conduit which method comprises the step of contacting said obstruction with a composition comprising urea, sulfuric acid, and water, in which composition the urea/$H_2SO_4$ molar ratio is within the range of about ½ to about 3/2 and the $H_2O/(urea+H_2SO_4)$ molar ratio is less than about 2.5, and wherein said obstruction comprises matter selected from the group consisting of protein, cellulose, and combinations thereof.

27. The method defined in claim 26 wherein said obstruction further comprises matter selected from the group consisting of metal oxides, hydroxides, carbonates, thiocarbonates, and simple and complex metal salts, and combinations thereof.

28. The method defined in claim 26 wherein said composition further comprises a member selected from the group consisting of surfactants, non-aqueous polar solvents, and combinations thereof.

29. A method for removing an obstruction from the interior of a conduit which method comprises the step of contacting said obstruction with a composition comprising urea, sulfuric acid and about 1 weight percent water or less, in which composition the urea/sulfuric acid molar ratio is within the range of about 1/1 to less than 2, and wherein said obstruction comprises matter selected from the group consisting of protein, cellulose, and combinations thereof.

30. The method defined in claim 29 wherein said composition is contacted with said obstruction at a temperature of at least about 90° C.

31. The method defined in claim 30 wherein said composition comprises at least about 0.2 weight percent water.

* * * * *